June 20, 1939. E. E. SHEPARD 2,163,500
DENTAL FLOSS ADJUSTER
Filed Dec. 18, 1937
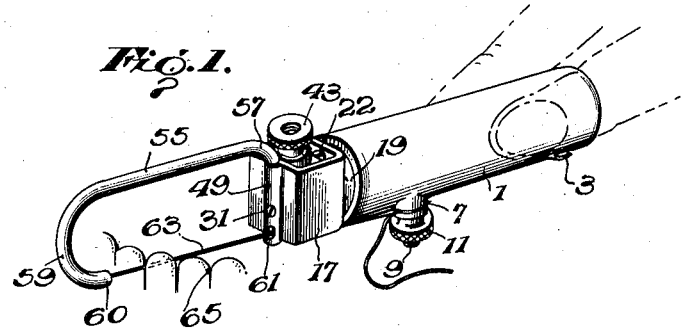
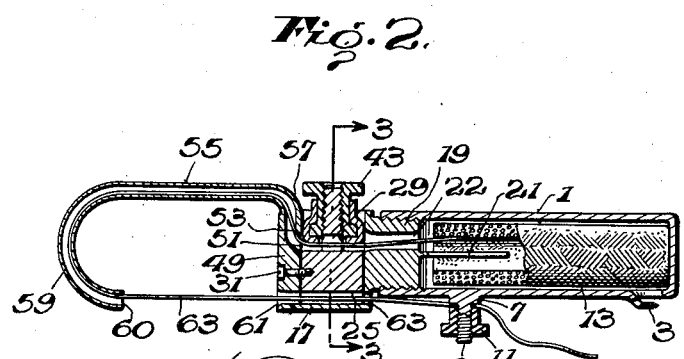
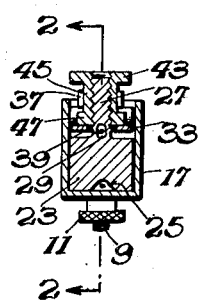
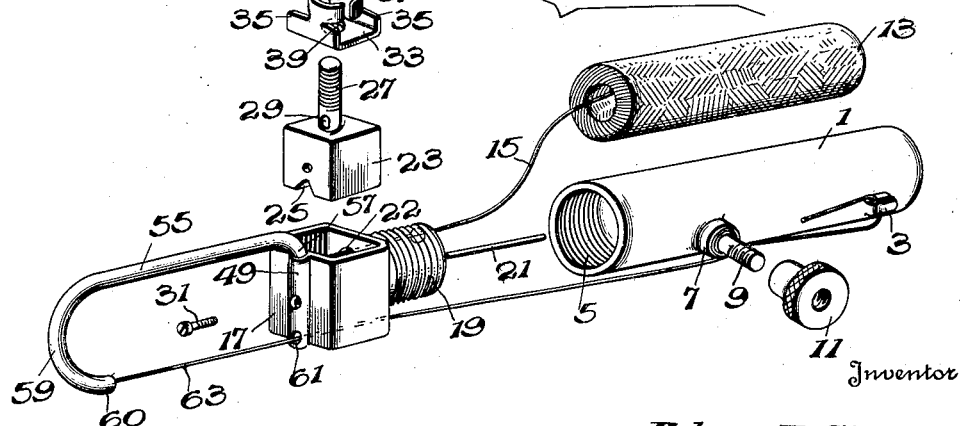
Inventor
Edwin E. Shepard
By Philip O. W. Teck
Attorney Patented June 20, 1939

2,163,500

UNITED STATES PATENT OFFICE 2,163,500

DENTAL FLOSS ADJUSTER

Edwin E. Shepard, San Francisco, Calif.

Application December 18, 1937, Serial No. 180,650

8 Claims. (Cl. 132—92)

It is an object of this invention to provide a dental floss adjuster containing a supply of dental floss which is easily manipulated to present a strand of floss in position for use.

It is a further object of this invention to provide a dental floss adjuster which presents a portion of a strand of dental floss in taut position for application to the teeth of the user of the device.

Another object of this invention is to provide a dental floss adjuster containing a supply of dental floss from which a strand may be pulled without sticking or clogging in the device to present a fresh portion thereof for application to the teeth of a user.

A further characteristic of this invention is to provide a dental floss adjuster containing a supply of dental floss from which a strand may be easily pulled without clogging or sticking but the freedom of flow of the strand is so restrained in its movement that a greater amount of floss will not be pulled than is desired.

A further feature of this invention is to provide a dental floss adjuster which is controllable to stop strand feeding without injuring the strand of dental floss.

An additional object of this invention is to provide a dental floss adjuster which allows sufficiently free feeding of a strand of floss yet provides by its design an automatic slight retarding action thereon and in addition provides further retarding action on the strand which is controllable by and at the will of the user of the device.

A further object of this invention is to provide a dental floss adjuster having convenient means for actuation by the user for stopping strand feeding and convenient and accessible means for securing the used end of the strand after it has been pulled taut through the device.

And yet another object of this invention is to provide a dental floss adjuster which keeps the floss in a sanitary condition ready for use at all times.

It is also an object of this invention to provide a dental floss adjuster for receiving a strand of dental floss which may be threaded into the device with great facility.

Another object of this invention is to provide a dental floss adjuster, the construction of which is compact and presents a sturdy device which may be carried in the pocket, pocket-book, or the like of the user.

It is also an object of this invention to provide a dental floss adjuster which is entirely practical and may be produced inexpensively.

One of the objects of this invention is to provide a dental floss adjuster which is designed to considerably conserve the supply of dental floss stored for use therein, thereby eliminating waste of dental floss which inevitably results when most holders and adjusters are used.

With the foregoing general objects, features, and results in view, as well as certain others which will be apparent from the following explanation, the invention consists in certain novel features and design, construction, mounting and combination of elements, as will be more fully and particularly referred to and specified hereinafter.

Referring to the accompanying drawing:

Fig. 1 is a perspective view of the device in elevation in the hand of the user.

Fig. 2 is a longitudinal section of the device taken on line 2—2, of Fig. 3.

Fig. 3 is a transverse section of the device taken on line 3—3, of Fig. 2.

Fig. 4 is a perspective view of the device with the elements thereof separated but in position for assembly.

The dental floss holders and adjusters with which I am familiar and with which I have experimented have several common defects which reduce their practicability in actual use. I have designed a device of this type which has overcome these difficulties and my experiments with the device of this invention have proved that certain characteristics must be embodied in a dental floss adjuster if it is to operate with the necessary accuracy and ease. The common dental floss of commerce is impregnated with wax and this has been one of the causes of the difficulties which have been encountered in the devices of this type which have heretofore been known. In the dental floss holders and adjusters with which I am familiar I have found that a strand of floss as it is pulled through the device to present a fresh portion for application to the teeth of the user leaves in the channels provided for the strand much of the wax with which the strand is impregnated. Deposit of such residue results in two fundamental disadvantages; namely, it is injurious to the floss itself and reduces its advantageous action in the area between the user's teeth, and it also so seriously clogs the device as to make it impossible to pull the strand through it to provide a fresh portion of strand for use. After considerable experimentation with various means for accomplishing the aims and purposes for which I have sought I discovered that the main cause of the aforementioned difficulties was in the design of former devices wherein sharp angles were used in the channels through which the strand traveled. The strand of dental floss in its course of travel through such channels lost a great deal of its wax on these angles and a resultant clogging occurred so that the strand could not be pulled through the device. I also found that a sharply sinuous course as above defined not only removed the wax from the strand of floss but it also oftentimes loosened and so damaged the fibers of the strand as to seriously weaken it with the result that when the strand was actually used it could not stand the necessary pressures and would break.

In studying the problem of preventing injury to the strand of dental floss itself and in seeking to eliminate the danger of tube clogging through which the strand is supplied it was found that the dental floss would pull out too easily and quickly if a certain amount of curvature in the channel was not provided. The consequences of this would naturally be considerable waste of the dental floss and would also render difficult adjusting and securing the strand thereof in proper taut position for use. From my experiments I discovered that it was necessary to provide a particular course of travel for the strand of floss which would prevent clogging and yet would provide a sufficient braking or restraining action on the strand. In the device disclosed in this application I have provided a structure which overcomes these aforementioned defects of the dental floss holders and adjusters of the prior art.

In addition to providing a natural braking action on the strand caused by the particular strand passages employed I have designed a further and auxiliary means for restraining freedom of strand flow. This auxiliary regulating means is under the control of the user of the device and may be employed at any time.

The same handicaps are apparent in prior devices in the means utilized for securing both ends of a strand of dental floss when it is disposed in position for application to the teeth of a user. These problems have been solved by my apparatus which I am about to describe in detail. In overcoming these disadvantages and in solving these problems I have constructed a dental floss adjuster and holder which is compact, easy to use, and may be adjusted to present a new section of fresh strand with the greatest facility.

Referring to the drawing the numeral 1 designates an elongated cartridge member which serves as a handle for my device and also serves as a compartment or container for the supply of dental floss which is usually obtained in rolled form. A tab 3 providing a cutting element to cut the used end of the strand of dental floss when desired is struck out of the material of the cartridge. This cutter is of the usual and well known type and may present a sharpened inner edge which will quickly and easily snip off a piece of strand. The cartridge provides a container having one end closed and the other end opened, the opened end thereof being internally screw threaded as at 5, for a purpose to be hereinafter described.

Disposed on the wall of the cartridge 1, spaced from but on a line with the cutter element 3 is a base member 7 carrying an outwardly projecting externally screw threaded post 9 which is adapted to have screwed thereon a cap nut 11. A roll or the like of dental floss 13 is disposed in position within the cylindrical cartridge 1 and a strand 15 of floss is pulled from the roll to extend to the exterior of the cartridge through the open end thereof.

For operative association with the cylindrical cartridge 1, I provide a strand receiving and guiding means through which the strand is pulled from the roll of dental floss to present a portion thereof for application to the teeth of the user. This unit includes a casing 17 having the upper end thereof open and an externally screw threaded nipple 19 projecting outwardly from a side wall thereof, on which the cartridge is adapted to be screwed. A pin or shaft 21 is carried on and extends rearwardly from the nipple and is adapted to project into the hollow central portion of the roll 13 which is contained within the cartridge 1. It is apparent that shaft 21 acts as a support and positioner for the roll of dental floss when it is in position in the cartridge and the whole unit is in assembled position. The nipple 19 is provided with a longitudinal bore 22 therethrough which mates with an opening provided through the casing 17 to receive the strand 15 flowing from the roll of dental floss carried in the cartridge.

Disposed within the casing 17 I provide a block member 23 of a size to snugly fit within the casing and to seat therein without relative movement with respect thereto. The block is removably held in position in the casing by means of a screw 31. A groove 25 extends across the lower face of the block 23 adjacent the bottom of the casing and an upstanding externally screw threaded post 27 projects upwardly from the upper plane surface of the block to provide a stem extending a distance beyond the upper edges of the casing 17. The upstanding post has a hole 29 bored therethrough adjacent the lower end thereof to provide an opening which is parallel to the groove 25 provided in the lower face of the block. It is to be pointed out that when the block is in position disposed within the casing 17 the hole 29 mates with the bore 22 of the nipple 19 to provide a strand receiving and feeding channel extending through the nipple and through the post 27 to permit a strand to be fed to and extend through the casing 17, and furthermore, it is apparent that a parallel used strand receiving groove 25 is provided through the lower portion of the casing 17. As the description proceeds the function of the used strand receiving groove will be made clear.

To complete the strand controlling and guiding unit which in assembled position is housed within the casing 17 I employ a pressure plate 33 having two opposing edges bent upwardly to form flanges 35 which are provided with an annular split collar 37 all as clearly disclosed in Fig. 4 of the drawing. The pressure plate has a circular opening 39 in the center thereof for receiving therethrough the post 27 which projects upwardly from the block 23.

For controlling movement of pressure plate 33 in the casing relative to the stationary block 23 I utilize an internally threaded tubular nut 41 adapted to be screwed on the post 27 after the pressure plate is in position thereon. This tubular member comprises a knurled head 43, a shank 45 and an annular shoulder 47 designed to rest against the pressure plate while the collar is loosely clasped about the shank of the tubular member. It will be seen that rotation of the tubular member upon post 27 will cause the pressure plate to be raised and lowered with respect to the block 23 and upon inward rotation of the tubular member the pressure plate will bear against the upper surface of the block and that varying degrees of pressure may be obtained depending upon the amount of rotation of the tubular member. Furthermore due to the preferred use of a material having a degree of resiliency there is a certain amount of spring or flexibility inherent in the design of this portion of my device, the purpose of which will become apparent as the description of my invention proceeds.

On the forward wall of the casing 17 I have shown an elongated rib or thickened portion 49 which serves as a casing reinforcing medium and also at its lower and generally upper portions as a receiving and guiding means for the strand of dental flow flowing from the floss supply roll. Referring particularly to Fig. 2 of the drawing, it will be seen that the rib adjacent the top surface of the block 23 is formed with a bore 51 opening into the interior of the casing. This bore extends into the rib to form a channel 53 which curves gradually and gently upwardly to the top of the rib, presenting only curved inner walls to the channel in changing the course from horizontal within the casing 17 to vertical within rib 49. It is to be noted that the bend or curve in the bore which changes the channel from a horizontal to a vertical course forms in effect at its forward internal wall a curved dental floss deflecting surface which gradually and without any sharp bends, corners, or the like, changes the direction of travel of the strand.

Secured in any suitable and convenient manner in the upper end of the channel 53 is a tubular member of generally hook-like shape which comprises a main rectilinear portion 55, a rear slightly downwardly bent portion 57 which is secured in the channel 53 and an opposing or forward goose neck portion 59, the open end or nozzle 60 of which extends rearwardly toward the casing 17 but spaced therefrom and is in substantially the same horizontal plane as the groove 25 in the block 23. As the hook-like member is tubular and one end thereof is disposed within the channel in the rib which opens into the casing interior it is readily apparent that I have provided a continuous channel extending from the cartridge to the end 60 of the goose neck portion of the hook-like tubular member.

I provide an opening 61 extending through the rib 49 in the casing adjacent the groove 25 in the block 23 and I also provide an opening 63 in the rear wall of the casing 17 adjacent the groove 25 whereby a channel way is provided through the lower portion of the casing from the exterior of the forward wall thereof to the exterior of the rear wall.

Upon loading the cartridge with a fresh roll of dental floss it is of course necessary to thread a strand therefrom through the various channels which are provided within the device. In accomplishing this I have found it convenient to employ a special flexible bristle or the like stiffened somewhat with a material such as beeswax about which the end portion of the strand of dental floss is wound. It is then quite simple to quickly pass the bristle carrying the strand through the device with the strand following. The threading may also be greatly facilitated by providing a roll of dental floss having the end portion of the loose end stiffened to thereby keep the strand from buckling while being threaded through the device. If the floss itself is stiffened the necessity for a bristle is eliminated.

In preparing my dental floss adjuster and holder for use the cartridge 1 is loaded with a roll of dental floss which is positioned therein on rod 21. The free end of the floss is pulled therefrom and threaded into and through the bore 22 extending through the nipple 19 to the interior of the casing. The elements which are carried within the casing are, of course, assembled in position therein with the pressure plate 33 raised above and out of contact with the top surface of block 23 to allow the strand of floss to pass freely therebetween and through the hole in post 27 which is in line with the bore in the nipple. It is to be understood that in feeding the strand from the roll of dental floss through the casing its passage therethrough is aided by the hole 29 in the post 27. The strand by being led through such a hole is kept on its desired forward course and twisting thereof on the flat upper surface of block 23 is retarded. The strand extends through the casing and into the opening 51 in the rib 49 and up into the channel 53 being guided by the gently sinuous formation of the channel and deflected upwardly by the forward internal curved surface, from there the strand is threaded through the hook-like tubular member, the curvatures of which are gradual with no sharp interior bends or corners. As the strand hangs free at the open end 60 of the goose neck portion 59 it is directed through the opening 61 in the casing and threaded through the groove 25 in the lower surface of block 23 and extends outside the casing through the opening 63 in the rear wall thereof.

When the strand has been threaded as described the pressure plate 33 is lowered by means of the tubular member 41 and forced against the upper surface of block 23 to securely hold the strand therebetween and to positively lock it against feeding travel through the device. The other or used end of the strand which extends through the rear wall of the casing is pulled against the restrained or secured feed end of the strand to tighten the entire length of strand from the point where it is held by pressure plate 33 to the post 9 to which it is wound while under tension and secured thereto by means of the cap screw 11. Thus an exposed length 63 of taut strand is presented extending from the open end of the goose neck to the casing which is adapted to be applied to the teeth 65 of the user as particularly disclosed in Fig. 1 of the drawing.

After the exposed length of floss 63 has been used and a fresh length is desired in position between the goose neck and the casing, the tubular member 41 is unscrewed sufficiently to release the strand from its secured position pressed between the pressure plate 33 and the upper surface of block 23. The used strand which has been fastened to post 9 is released and pulled upon to feed strand from the roll to provide a fresh length 63. The sinuous formation of the feed channels is such as to provide a braking action upon the strand as it is pulled through the device, however, if more tension is desired to restrain and slow up the flow of strand the user of the device may operate the tubular nut member 41 sufficiently to lower pressure plate 33 into slight contact with the strand to thereby act as a brake to slow up the flow of strand. It is to be understood that before using the device on the teeth of the operator the pressure plate must be forced downwardly with sufficient pressure to engage the strand between itself and the block and to hold it against movement.

When a fresh portion of strand 63 has been drawn into position for use and the strand locking means has been operated as above described to restrain the strand from further feeding through the device the used end which extends from the casing through the opening 63 is pulled tightly and wound about post 9 and fastened thereto by nut 11; the device is then in operable condition.

What I claim is:

1. In a dental floss adjuster, a casing having a dental floss supply cartridge removably secured thereto, the cartridge in position thereon rigidly connected to the casing, said casing and said cartridge having openings therein for feeding a fresh strand from the interior of the cartridge to the interior of the casing, a curved strand feed channel through said casing to guide and change the direction of travel of the strand, and a used strand rectilinear channel extending through said casing spaced from said feed channel, and a fresh strand receiving tubular member having one end mounted in the casing to receive a strand from the casing feed channel and the other end open and spaced from the casing in a plane with the used strand channel to direct a strand toward said channel for travel therethrough, and means in the casing operable to press upon the strand in the feed channel to lock it against travel therethrough, and means on the cartridge for securing the used end of the strand after it has been pulled taut to present an exposed portion of strand extending between the casing and the open end of the tubular member.

2. In a dental floss adjuster, a casing having a dental floss supply cartridge removably secured thereto, said casing having an opening therein to connect with an opening provided in the cartridge for feeding a strand therefrom into the casing, and the casing having a strand feed outlet, and means disposed within the casing for guiding and for controlling the travel of the strand therethrough including a stationary member having a plane surface supporting the strand, a post projecting from said stationary member and provided with an aperture therein through which the strand is adapted to pass, and a pressure plate mounted on said post for actuation to position locking the strand between the block and the pressure plate and to position free of the strand, and a hook-like tubular member adapted to receive and guide the strand therethrough having one end mounted on the casing for receiving the strand as it extends from the casing feed outlet, the other end of said tubular member being spaced from the casing, and means on said cartridge for securing the end of the strand extending from the tubular member after it has been tightened against the locking action of said pressure plate to present an exposed taut length of strand between the free end of the tubular member and the casing.

3. A dental floss adjuster including in combination a casing, a cartridge mounted on the casing for carrying a supply of dental floss, and a hook-like tubular member carried on and projecting from said casing, channels provided opening into said cartridge and extending through said casing to open into said tubular member for feeding a strand from the cartridge through the casing and into and through the tubular member, and means in the casing for guiding the strand in its passage therethrough and for stopping the feeding of the strand, including a stationary member upon which the strand flows, a projecting post carried on said stationary member having an aperture therein through which the strand is threaded, a pressure plate loosely mounted on an element carried on and adapted to travel upon said post and operative to dispose the pressure plate in position holding the strand between the stationary member and itself whereby further strand feeding is stopped.

4. In a dental floss adjuster, means for guiding and controlling the flow of dental floss therethrough including, a casing having an inlet and an outlet for a fresh strand of dental floss and an inlet and outlet for the strand after it has been used, a stationary block disposed in said casing, and a groove provided in the lower side of said block extending between the used strand casing inlet and outlet, the upper opposite side of said block presenting a plane surface extending between the fresh strand casing inlet and outlet, a hook-like tubular member mounted on said casing and having its inlet and opening into the interior of the casing above the plane surface of said block, and means in said casing for deflecting the fresh strand into the tubular member, the outlet end of said tubular member spaced from the casing and disposed in the plane of said groove in said block to direct the strand towards said groove, a post projecting from said upper surface of the block provided with an aperture to receive the fresh thread and keep its direction of travel substantially straight and means carried on said post for locking the strand against movement through the casing.

5. A dental floss adjuster including in combination a casing, a dental floss supply cartridge carried by the casing and a tubular member carried on and projecting from the casing, channels provided in said casing opening into said cartridge and extending through said casing to open into said tubular member for feeding a strand therethrough, and means disposed in said casing for providing both an absolute lock for stopping travel of the strand therethrough and for merely retarding travel of the strand therethrough including a block disposed in said casing having a strand supporting upper surface and a pressure plate operable to position pressing the strand against said block to lock the strand against travel therethrough and operable to reduced pressure position against said strand to merely retard the travel of the strand through the casing.

6. A dental floss adjuster including in combination a casing, a dental floss supply cartridge carried by the casing and a tubular member carried on and projecting from the casing, channels provided in said casing opening into said cartridge and extending through said casing to open into said tubular member for feeding a strand therethrough, an element disposed within said casing to provide a strand supporting surface, and means within said casing adjustable relative to said strand supporting element to position pressing a strand against the element to lock the strand against travel through the casing.

7. A dental floss adjuster including in combination a casing, a cartridge mounted on the casing for carrying a supply of dental floss, and a hooklike tubular member carried on and projecting from said casing, channels provided opening into said cartridge and extending through said casing to open into said tubular member for feeding a strand from the cartridge through the casing and into and through the tubular member, and means in the casing for guiding the strand in its passage therethrough and for stopping the feeding of the strand, including a stationary member upon which the strand flows, a guide element for the strand mounted on said stationary member, a strand locking means operable to reciprocate on said guide element to position locking the strand between it and the stationary member and to position freeing the strand for travel through the casing.

8. A dental floss adjuster including a casing providing a chamber through which a fresh strand of dental floss and a used strand of dental floss are adapted to flow, a stationary member disposed within the casing having a fresh strand supporting surface and a used strand surface, each surface providing guide means for the strand as it travels through the chamber, and strand controlling means disposed in said casing adjacent the fresh strand supporting surface for operation to position disposed against said surface to clamp the fresh strand therebetween to thereby lock the strand against travel through the casing.

EDWIN E. SHEPARD.